United States Patent
Draper et al.

(10) Patent No.: US 10,764,383 B1
(45) Date of Patent: Sep. 1, 2020

(54) CORRELATION OF USAGE TO CORRESPONDING USERS THROUGH DEVICE AND DNS AGENTS

(71) Applicant: CatchOn Inc., Nashville, TN (US)

(72) Inventors: Jena Draper, Dallas, TX (US); Leo Brehm, Medfield, MA (US); Alfredo Rodriguez, Aguascalientes (MX); Kevin Custer, Lakewood, CO (US)

(73) Assignee: CatchOn, Inc., Dallas, TX (US)

( * ) Notice: Subject to any disclaimer, the term of this patent is extended or adjusted under 35 U.S.C. 154(b) by 57 days.

(21) Appl. No.: 15/938,589

(22) Filed: Mar. 28, 2018

Related U.S. Application Data

(60) Provisional application No. 62/477,776, filed on Mar. 28, 2017.

(51) Int. Cl.
*H04L 29/08* (2006.01)
*H04L 12/26* (2006.01)
*H04L 29/12* (2006.01)
*G06F 11/34* (2006.01)

(52) U.S. Cl.
CPC .......... *H04L 67/22* (2013.01); *G06F 11/3438* (2013.01); *H04L 43/04* (2013.01); *H04L 43/062* (2013.01); *H04L 61/1511* (2013.01); *H04L 67/02* (2013.01)

(58) Field of Classification Search
CPC .............................. H04L 67/22; G06F 11/3438
See application file for complete search history.

(56) References Cited

U.S. PATENT DOCUMENTS 5,796,952 A * 8/1998 Davis .................. G06F 16/9535
709/224
6,678,824 B1 * 1/2004 Cannon .................. A63F 13/10
726/22

(Continued)

FOREIGN PATENT DOCUMENTS

CN 103825969 5/2014

OTHER PUBLICATIONS

Chaudhari et al, "User and Device Tracking in Private Networks by Correlating logs: A System for Responsive Forensic Analysis", IEEE (Year: 2014).*

(Continued)

*Primary Examiner* — Lashonda T Jacobs
(74) *Attorney, Agent, or Firm* — Bradley Arant Boult Cummings; Timothy L. Capria

(57) ABSTRACT

A system for correlating private IP addresses with usage of applications to associate particular users with the application usage. An application executes on a first server and is accessible by devices via a network connection. Tracking software sends data to a second server indicative of a private IP address the device which accesses the tracking software. The second server determines a user identifier and transmits second data to a third server, the second data indicates the private IP address and a second server identifier. A DNS server tracks usage of the application to associate a time stamp, a domain and the private IP address with a log record. The log record is transmitted to the third server. The third server queries the log record by the private IP address to match data from the log record with the second data to associate the log record with the user identifier.

21 Claims, 6 Drawing Sheets

(56) References Cited

U.S. PATENT DOCUMENTS

| | | | |
|---|---|---|---|
| 6,718,467 B1* | 4/2004 | Trostle | H04L 9/0844 380/281 |
| 7,191,447 B1* | 3/2007 | Ellis | G06Q 10/06 719/310 |
| 7,517,220 B2* | 4/2009 | Corn | G06Q 30/02 434/322 |
| 7,739,282 B1* | 6/2010 | Smith | H04L 67/22 707/661 |
| 8,255,489 B2 | 8/2012 | Afergan et al. | |
| 8,341,721 B2 | 12/2012 | Kim et al. | |
| 8,793,809 B2* | 7/2014 | Falkenburg | H04L 63/104 726/30 |
| 9,191,402 B2 | 11/2015 | Yan | |
| 9,241,079 B1* | 1/2016 | Cai | H04M 15/885 |
| 9,247,017 B2* | 1/2016 | Agarwal | G06F 3/04847 |
| 9,342,698 B2* | 5/2016 | McPherson | G06F 16/951 |
| 9,354,963 B2* | 5/2016 | Ranganathan | G06F 11/079 |
| 9,467,417 B2 | 10/2016 | Zampiello | |
| 9,473,495 B2* | 10/2016 | Kadur | H04L 63/083 |
| 9,705,922 B2 | 7/2017 | Foxhoven et al. | |
| 9,787,784 B2 | 10/2017 | Mason et al. | |
| 9,806,940 B1* | 10/2017 | Nielsen | H04L 41/0803 |
| 9,843,601 B2 | 12/2017 | Fakeri-Tabrizi et al. | |
| 9,860,328 B2 | 1/2018 | Bagasra | |
| 9,961,574 B1 | 5/2018 | Tubi et al. | |
| 9,973,590 B2 | 5/2018 | Wu | |
| 10,540,906 B1* | 1/2020 | Fieldman | G09B 5/10 |
| 2002/0035624 A1* | 3/2002 | Kim | H04L 29/12377 709/222 |
| 2002/0127530 A1* | 9/2002 | Weakly | G09B 5/02 434/350 |
| 2003/0165802 A1* | 9/2003 | Murphy | G09B 7/00 434/350 |
| 2005/0138383 A1* | 6/2005 | Vainstein | G06F 21/645 713/178 |
| 2005/0246241 A1* | 11/2005 | Irizarry, Jr. | G06Q 30/0601 705/26.1 |
| 2006/0024649 A1* | 2/2006 | Vernon | G09B 7/02 434/201 |
| 2007/0204051 A1* | 8/2007 | Zhang | H04L 29/12132 709/230 |
| 2008/0199042 A1* | 8/2008 | Smith | G06Q 30/0239 382/100 |
| 2008/0213741 A1* | 9/2008 | Redd | G09B 7/08 434/365 |
| 2008/0215670 A1* | 9/2008 | Redd | G09B 7/08 709/203 |
| 2008/0281696 A1 | 11/2008 | Whitehead | |
| 2008/0286741 A1 | 11/2008 | Call | |
| 2008/0286743 A1 | 11/2008 | O'Loughlin et al. | |
| 2009/0113036 A1* | 4/2009 | Zampiello | H04L 67/22 709/224 |
| 2009/0248729 A1* | 10/2009 | Bruno, Jr. | G06F 16/9535 |
| 2012/0023570 A1* | 1/2012 | Gorodyansky | H04L 63/0407 726/12 |
| 2012/0137340 A1* | 5/2012 | Jakobsson | H04L 63/0815 726/1 |
| 2013/0198065 A1* | 8/2013 | McPherson | H04L 12/1435 705/40 |
| 2014/0229898 A1* | 8/2014 | Terwedo | G06F 3/04842 715/835 |
| 2014/0349272 A1* | 11/2014 | Kutty | G09B 5/08 434/362 |
| 2015/0007307 A1* | 1/2015 | Grimes | G09B 7/02 726/18 |
| 2015/0193285 A1* | 7/2015 | Hamzata | G06F 9/5011 719/313 |
| 2015/0283455 A1* | 10/2015 | Nova | A63F 9/183 463/9 |
| 2015/0310756 A1* | 10/2015 | Nakamura | G06Q 50/20 434/362 |
| 2016/0164957 A1* | 6/2016 | Leemet | G06Q 30/04 709/203 |
| 2016/0380960 A1* | 12/2016 | Pandrangi | H04L 67/2814 709/224 |
| 2017/0063927 A1 | 3/2017 | Schultz et al. | |
| 2017/0180494 A1* | 6/2017 | Agrawal | H04L 43/18 |
| 2018/0013775 A1 | 1/2018 | Jee et al. | |
| 2018/0027416 A1 | 1/2018 | Bickford et al. | |
| 2018/0054493 A1* | 2/2018 | Heilpern | H04L 67/04 |
| 2018/0075478 A1 | 3/2018 | Rogas | |
| 2018/0315061 A1* | 11/2018 | Brown | H04L 67/22 |

OTHER PUBLICATIONS

Xu, Qiang et al., Identifying Diverse Usage Behaviors of Smartphone Apps, IMC '11 Proceedings of the 2011 ACM SIGCOMM conference on Internet measurement, Nov. 2-4, 2011, pp. 329-344, Berlin, Germany.

Kirchler et al.; Tracked Without a Trace: Linking Sessions of Users by Unsupervised Learning of Patterns in Their DNS Traffic; AISec '16 Proceedings of the 2016 ACM Workshop on Artificial Intelligence and Security; pp. 23-34; Oct. 28, 2016.

* cited by examiner

CORRELATION OF USAGE TO CORRESPONDING USERS THROUGH DEVICE AND DNS AGENTS

FIELD OF THE INVENTION

The following relates to systems to enable Domain Name Server (DNS) data on application and domain usage to be correlated to private IP addresses and particular users.

BACKGROUND OF THE INVENTION

The availability and types of cloud computing applications have increased exponentially in the past years. So too has the availability and accessibility of mobile computing, particularly tablet computers, smart phones and other devices. More and more devices and applications are made available each day that use and consume network resources and data. In many instances, it is useful to know how exactly users are interacting with hosted software applications, but this is difficult to determine because a DNS often only provides part of the data to provide for meaningful comparison and tracking.

Furthermore, it is often impossible to determine which specific user is interacting with a hosted software application and how this interaction is proceeding. Often, a user will connect to a network via various routers, hubs, switches and the like. Ultimately, the host software does not know the private IP address of the actual computer because this information is masked as the data traffic proceeds through the various routers/switches etc. For example, the hosted application may know that a particular router is contacting it based on the router's IP address, but the hosted application would not know which computer connected to that router is associated with the contact. Thus, the public IP address (of the router) would be known, but the private IP address of the actual computer on the local network would not be known.

Furthermore, many local networks are setup using similar networking technology and it is therefore possible that multiple users may have the same private IP address but they would be logging on via different networks or domains. This adds further complexity to the issue of accurately tracking.

On the user level, this means that correlation of the particular computer and the user login session is difficult if not impossible to accomplish given the complex networking technology normally employed. This is especially so in large organizations that have many computing devices connected to their networks and firewalls; encryption and other security measures may further mask the information needed to correlate individual users to the DNS and activity data.

Furthermore, mobile devices may frequently change their IP addresses on networks such that knowing the private IP address when the user begins the session may not provide sufficient visibility to the entire session with the hosted application. This is particularly an issue when the device changes networks or when the device is communicating with a different hub/router within the network. For example, if the device is on one end of a building, a first WiFi network extender/bridge may allow the device to connect whereas when that device is moved to a different area of the building, a different extender/bridge may allow such connection, but with a different private IP address.

SUMMARY OF THE INVENTION

Therefore, it is an object of the present invention to provide a system that enables DNS and activity data to be correlated with particular users.

It is another object of the invention to enable usage of hosted applications to be better categorized, tracked and analyzed on a more granular level, particularly on an individual user basis.

It is another object of the invention to enable usage of educational software to be tracked so that progress metrics can be correlated to usage of the software to validate, track and/or improve student performance.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

It is further understood that "server" as used herein includes but is not limited to separate and discrete hardware as well as virtualized servers or combinations thereof. For example, a first server and second server may be two virtualized servers which could operate on the same or different set of underlying hardware such as processor(s) and the like. But, in all circumstances, a "server" will include one or more associated computer processors.

These and other objects are achieved by providing a system for correlating private IP addresses with usage of applications to associate particular users with the application usage. The system includes a software application executing on a first server remote to a plurality of devices. The software application is accessible by devices via a network connection. A tracking software executes on a processor and sends data to a second server. The data received from the tracking software at the second server indicative of a private IP address of one of the plurality of devices which accesses the tracking software. The second server determines a user identifier based on the data and transmits second data to a third server, the second data indicative of the private IP address and further indicative of a second server identifier. A Domain Name System (DNS) server tracks usage of the software application by the one of the plurality of devices on the network to associate a time stamp, a domain and the private IP address with a log record. The log record is transmitted to the third server. The third server queries the log record by the private IP address to match data from the log record with data from the second data such that the log record is associated with the user identifier.

In one aspect, the log record includes data which correlates to the second server identifier such that the DNS server can be correlated to the second server, allowing duplicate private IP addresses within log records to be distinguished based on the DNS server that the log record is associated with. In another aspect the tracking software monitors a change in the private IP address from the private IP address to a second private IP address. The tracking software transmits data indicative of the change such that the user identification associated with the private IP address is further associated with the second private IP address.

In certain aspects a system is provided for correlating private IP addresses with usage of applications to associate particular users with the application usage. A software application provides educational materials and executes on a first server remote to a plurality of devices. The software is accessible by the plurality of devices via a network connection. A tracking software executes on a processor and sends data to a second server, the data is received from the tracking software at the second server and is indicative of a private IP address of one of the plurality of devices which accesses the tracking software. The one of the plurality of devices further has a public IP address associated therewith. The second server determines a user identifier based on the data and transmits second data to a third server, the second data is indicative of the private IP address and further indicative of a second server identifier. A Domain Name System (DNS) server tracks usage of the software application by the one of the plurality of devices on the network to associate a time stamp, a domain and the private IP address with a log record. The log record is transmitted to the third server. The third server queries the log record by the private IP address to match data from the log record with data from the second data such that the log record is associated with the user identifier.

In certain aspects the log record includes data which correlates to the second server identifier such that the DNS server can be correlated to the second server, allowing duplicate private IP addresses within log records to be distinguished based on the DNS server that the log record is associated with. In other aspects the tracking software monitors a change in the private IP address from the private IP address to a second private IP address. The tracking software transmits data indicative of the change such that the user identification associated with the private IP address is further associated with the second private IP address. In particular aspects, the educational materials include online courseware. In other aspects the second data associates an anonymous user identifier with the user identifier. In other aspects, the log record and second data are stored respectively on first and second databases. In certain aspects an API accesses the log record and said second data and generates a combined data file which includes the user identifier associated directly with the time stamp, domain and the private IP address. In certain aspects the first and second databases have separate access requirements such that assembly into the combined data file is accomplished only through the API. In other aspects, the second data includes an association between the user identifier and an anonymous identifier. In further aspects, the log record associates an anonymous identifier with the time stamp, domain and private IP address.

In one aspect a system is provided for tracking usage of a plurality of hosted software applications by user devices having private and public IP addresses. A software is executed on a first computing device and associates a private IP address of a device with a user identifier and records a user session in a first database, the user session associating the user identifier with the private IP address and the user session further related to a user accessing a hosted software application. A Domain Name System (DNS) server matches the private IP address to a log record to generate matched data having a time stamp, a domain and the private IP address associated therewith. A second computing device correlates the matched data to the user session to associate the user identifier with the time stamp, domain and private IP address.

In certain aspects, the user identifier is anonymous and a data file is stored on a database separate from the first database associates the user identifier with a non-anonymous user identifier. In other aspects an Application Programming Interface (API) is provided to access the data file stored on the database and the second computing device to associate the non-anonymous user identifier with the time stamp, domain and private IP address. In certain aspects, the software determines a change in the private IP address to associate that change in the private IP address with the user session.

In still other as aspects, a system is provided for tracking usage of a plurality of hosted software applications by user devices having a private IP address and associated with a public IP address. A portal is provided by software executes on a first computer and which associates a private IP address of a computing device with a user identifier and records a user session in a first database. The user session associates the user identifier with the private IP address and the user session further related to a user accessing a hosted software application via a network. The computing device is further associated with a public IP address. A Domain Name System (DNS) server is associated with the network, the DNS server matches the private IP address to a log record to generate matched data indicating a time stamp, a domain and the private IP address. In other aspects, a second computing device which correlates the matched data to the user session to associate the user identifier with the time stamp, domain and private IP address.

In certain aspects the user identifier is an anonymized user identifier. In other aspects a second database stores data which correlates the anonymized user identifier with non-anonymized user identifier. In still other aspects an Application Program Interface (API) accesses the second data and the matched data to correlate the non-anonymized user identifier with the time stamp, domain and private IP address.

In other aspects a method is provided for tracking usage of a plurality of hosted software applications. The method may include one or more steps of: receiving data from a tracking software executing on a processor, the data indicative of a private IP address of one of a plurality of devices which accesses one or more of the plurality of hosted software applications via a network, the one of the plurality of devices further associated with a public IP address; determining at a server a user identifier based on the data to generate second data which associates the user identifier with the private IP address; tracking usage of the software application with a Domain Name System (DNS) server to associate the private IP address of the device with a log record; and matching the log record with the user identifier by the private IP address.

In certain aspects the second data is further indicative of a server identifier, the server identifier associated with at least one server associated with a DHCP connection of the one of the plurality of devices. In still other aspects, the public IP address is the same as a networking device associated with the network and more than one of the plurality of devices has the same public IP address.

Other objects of the invention and its particular features and advantages will become more apparent from consideration of the following drawings and accompanying detailed description.

DETAILED DESCRIPTION OF THE INVENTION

Figure 1:
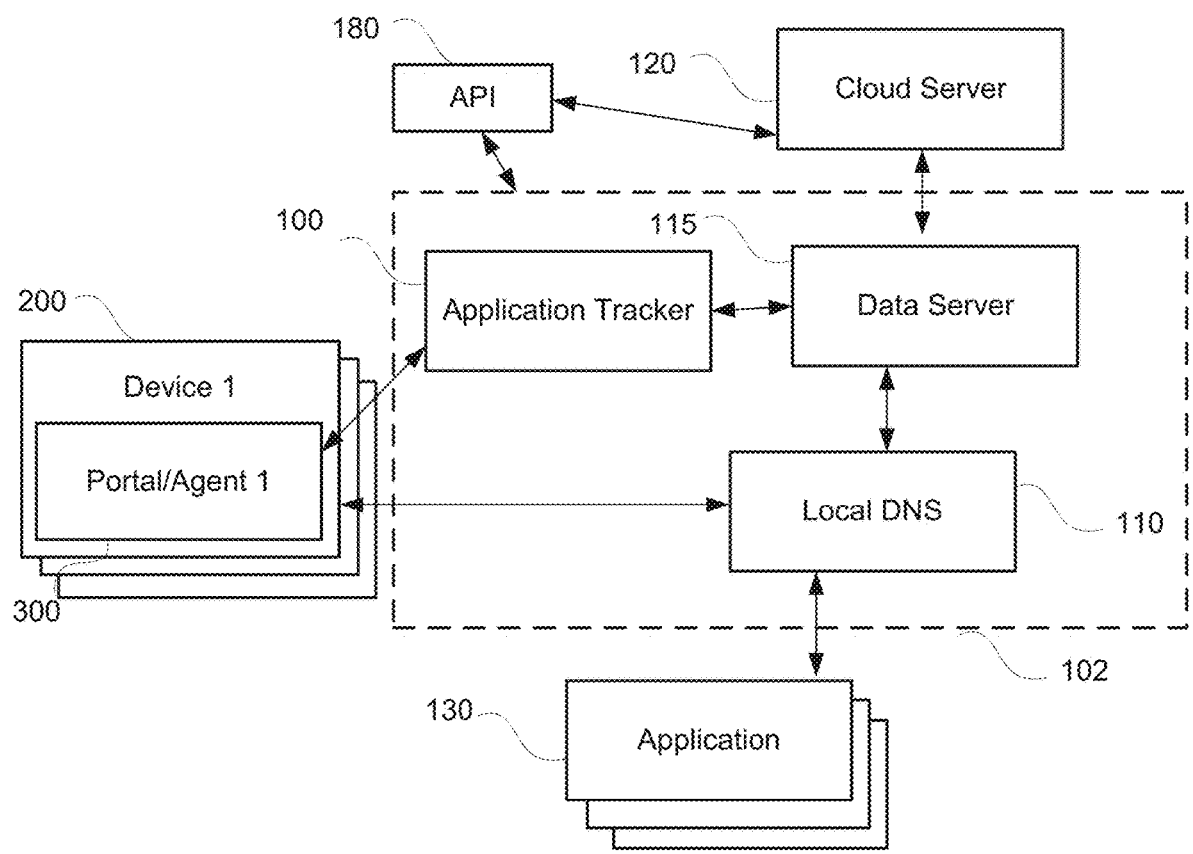
FIG. 1 is a functional flow diagram according to the present invention.

Referring now to the drawings, wherein like reference numerals designate corresponding structure throughout the views. The following examples are presented to further illustrate and explain the present invention and should not be taken as limiting in any regard.

The system architecture and specific portals/agents provide for the ability to correlate users with private IP addresses such that Domain Name Server (DNS) data can be correlated to the user such that user tracking provides more insight into use of hosted applications. Key elements of the system include a DNS 110, and portal/agent 300 and an activity processor of a data server 115. The DNS is generally an on-premise name server that tracks web traffic associated to a client's IP address. The portal/agent provides for a login to identify the user and the current device's IP address, the IP address may be identified in connection with the application tracker 100. The activity processor is associated with data server 115 and processes the web traffic from the DNS to replace the IP address with the user's email (or other identifier) and then uploads modified DNS log file(s) to a cloud server 120.

The portal/agent 300 may work in connection with an application tracker server 100. A number of devices 200 are connected to the network and access a portal 300 which may be a web browser. Alternately, an software agent is installed on the user device. This portal/agent 300 receives a user login and based on that login to the portal transmits data to the application tracker 100 which may be a local server. The portal may be accessed via a web browser or other local software or the device may log information to the portal based on which user is logged onto the device. By transmitting the data directly to the application tracker 100 in connection with the login, a login token can be correlated to the IP address of the device 200 on the local network. Particularly, the data when received from the device 200 allows the application tracker 100 to identify information such as the userid, domain, local IP and the district id. The userid may simply be the email of the user or in certain situations, this may be an encrypted identification or other identifier that associates with a particular user. This is determined based on the login token or via information sent from the locally installed device agent. The local IP is the device's local IP address, which can be determined because the portal/agent is configured to transmit the data to the application server such that when received, the local IP address is known or can easily be determined. The domain would be the domain that the network connection is coming from. The district id would be associated with the specific application tracker 100 such that when all of this data is sent to the data server 115, the data server 115 knows that it came from a particular application tracker 100 that is associated with a particular district id.

The district id may be a unique identifier that associates data traffic with a particular network connection. For example, if two schools using the system to track education software usage both have similar network configurations, it is contemplated that two devices may have the same local IP address as these may be assigned in a sequential order. Thus, the $5^{th}$ device to connect at any given time on both networks may have the same local IP address. Thus, the district id allows for the information to be separated based on where it is coming from.

The device 200 access the application 130 which may be a hosted software application which is hosted on a remote server accessible via a network connection. The local DNS 110 will generate log files 112 of traffic between the device 200 and the application 130. These log files may include information such as a date/time stamp, the IP address, the domain and the server IP address contacted.

These log files are then uploaded to the data server 115. The data server which includes an activity processor is then able to use the log files 112 along with the data received from the application tracker 100 to correlate the url and time stamp in the log file 112 with the user id and domain. The web traffic is then modified such that the user id replaces the ip address and in this way, the user id can correlate to the DNS traffic and therefore be used to determine what hosted applications the user was working with, how long and what features thereof. For example, a line in the text file may initially be 2016/12/16 14:58.538, client: 10.0.12.124, google.com, 148.34.54.1. This would be before the userid is replaced. Once matched and processed, the client "10.0.12.124" would be replaced with, for example 01522@@district.org. The modified data/log files may then be sent to a cloud server 120. The cloud server 120 may enable access to the data to allow for review/processing and/or generation of reports or analysis to determine when and how various applications are being used.

Figure 5:
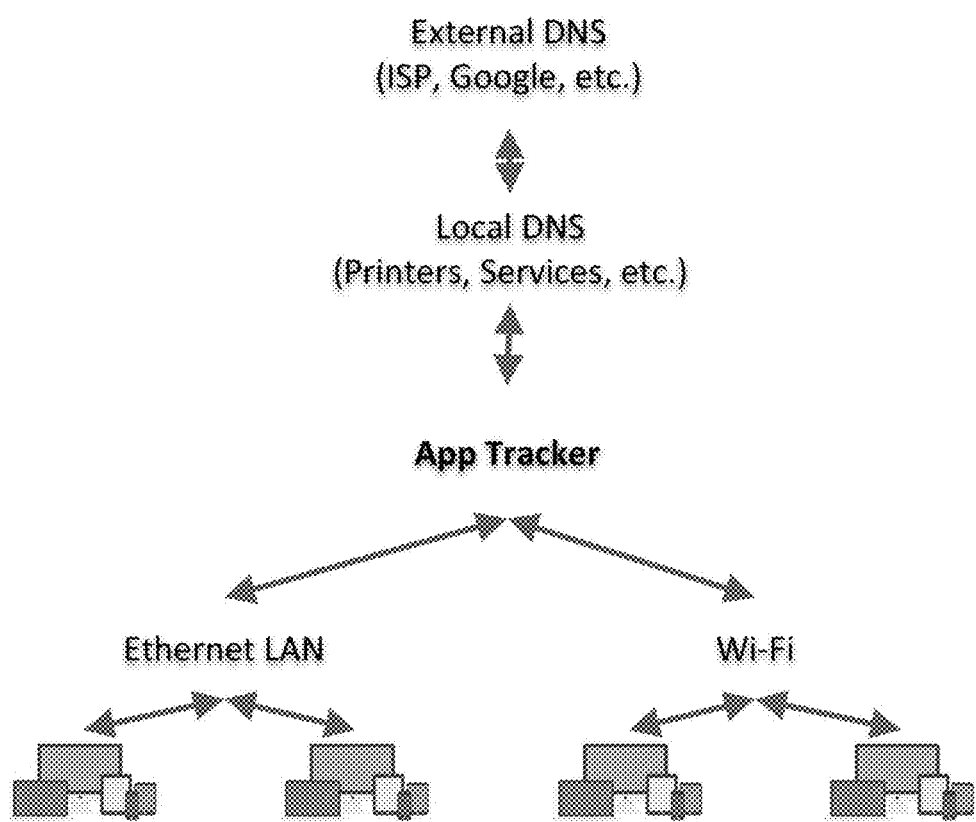
FIG. 5 is another functional flow diagram according to FIG. 1

Therefore, the combination of the application tracker 100, data server 115 and local DNS 110 may collectively be considered the app tracker 102 which becomes the primary DNS sent through DHCP to devices. For example, see FIG. 5 and FIG. 2 for additional detail.

Figure 2:
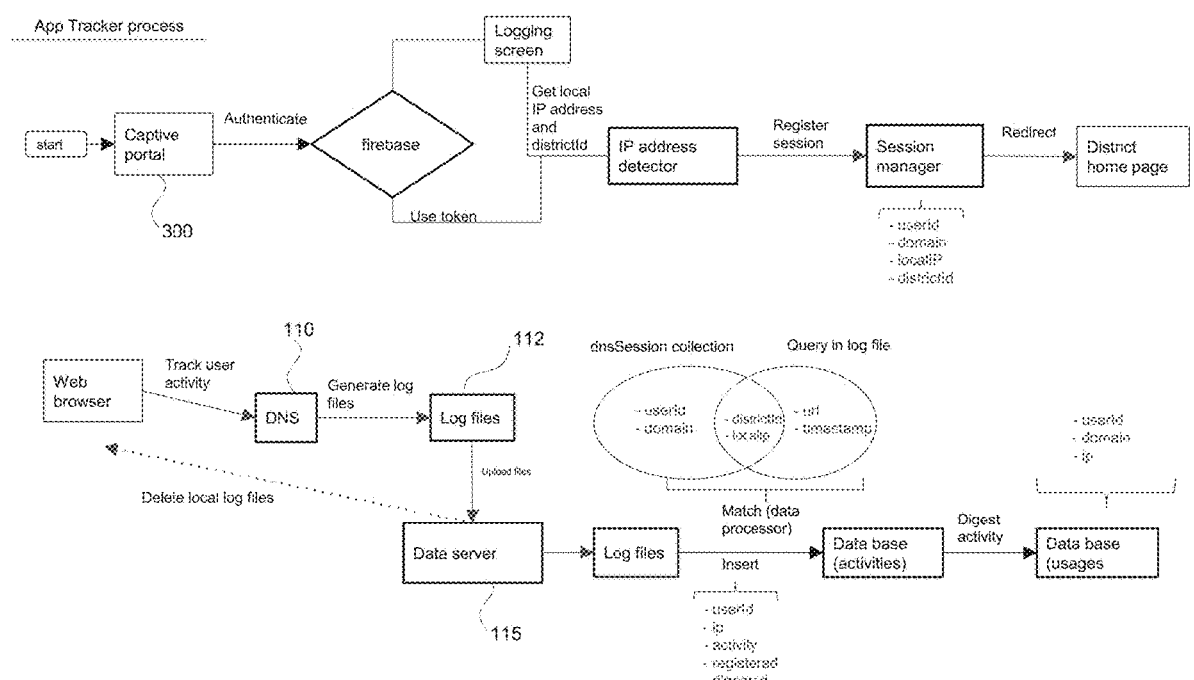
FIG. 2 is functional flow diagram showing additional features of FIG. 1

Referring to FIG. 2 and the app tracker 102, the user accesses the portal 300 to authenticate with generates a token and a logging screen to get the local IP address and district id. The IP address is detected and the application tracker 100 is coded to have an associated district id that correlates to the IP address. Each additional district would have its own application tracker 100 coded for its own district id that is sent with the session data including the user ID, domain, Local IP and district id. The user may then be re-directed to a particular home page. For example, the school home page in an educational setting. The user then accesses their web browser or a local application on a smart phone or tablet devices and activity is tracked with the DNS 110 to generate log files 112 that are uploaded to the data server. The data server then processes the information from the application tracker and the DNS to modify the log files to associate the user ID with the other DNS data as previously described. The modified log files are then accessed from the data server 115 or alternately uploaded to a separate cloud server 120 for processing.

In the situation where a tablet computer such an iPad is used, the login token may be associated with a first IP address and an agent 300 is installed on the iPad to detect a change in the device's IP address. The agent may log the last IP address transmitted via the application tracker 100 such that when a new IP address is recorded, the agent will transmit both the new and old IP addresses to the application tracker. The data server is then able to determine when DNS log files containing the new IP address should be modified to include the user ID that is associated with the old IP address. Future log files are then updated based on the association of the new IP address to the user ID until there is another change recorded by the agent. The change in IP address would have a time stamp on it such that DNS traffic can be queried by time stamp and new IP address to be sure that all appropriate entries in the log file are modified. In addition, the DNS traffic log files that may only be those that match the district id. For example, IP addresses may match across log files of different districts, thus the application tracker 100 and the DNS 110 would associate with particular district ids such that the correct users are correlated with the correct DNS traffic.

The session manager can record the user session to associate the userid, domain, local IP (private IP address) and district id with the particular session. The district id can be associated with the particular DHCP connection in the case that multiple devices have the same private IP address but on separate networks. E.g. if one school networked device as the same private IP address as another separate and discrete networked device, the two devices would not be associated with the same user, thus the district id can enable differentiation between particular networks which are known to be separate. As also shown the DNS can determine in the log file the URL and time stamp in addition to the district id and local IP (private IP address). Since both the session information and the log file have the local IP information (and also the district id), it is possible to correlate the user id, domain url, and time stamp. This provides for increased visibility in tracking of actual usage of applications correlated down to the actual user level. However, when the user id is determined locally and associated with the local IP address, the user id may be anonymized. A separate file/database is created to correlate the anonymous with the non-anonymous user id and the API 180 allows for accessing both the correlation file and the underlying DNS data which is associated with local IP addresses. The correlation file may be generated, for example, by the application tracker 100 or the portal/agent 300 or data server 115.

Figure 4:
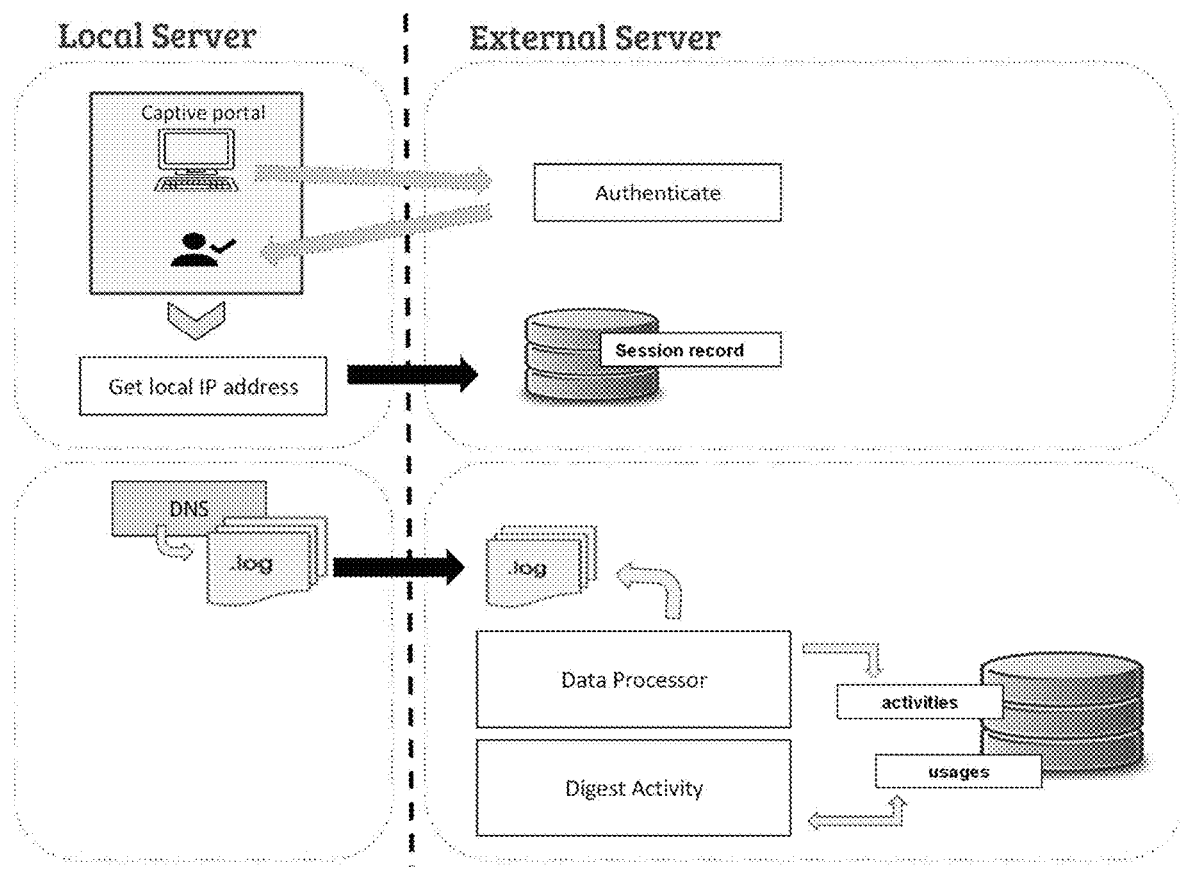
FIG. 4 is system architecture diagram according to FIG. 1.

Referring to FIG. 4, the local server includes the portal 300 and the application tracker 100 which enables the local IP address to be ascertained. The user is authenticated with the external server and the session is recorded at the external server. When the session is recorded, the userid, domain, local IP and district id are communicated to the external server. The external server may be the data server 115. The DNS generates log files which are sent to an external server which may be the data server 115 or another server. Activities and usages are determined and stored in the storage. The data server 115 can compare the session record to the activity/usage data associated with the DNS to then generate a modified log file that includes the user id in place of or in addition to the local IP. Optionally, the DNS files log files that have been uploaded to the data server 115 (or to the cloud 120) may be deleted.

Figure 3:
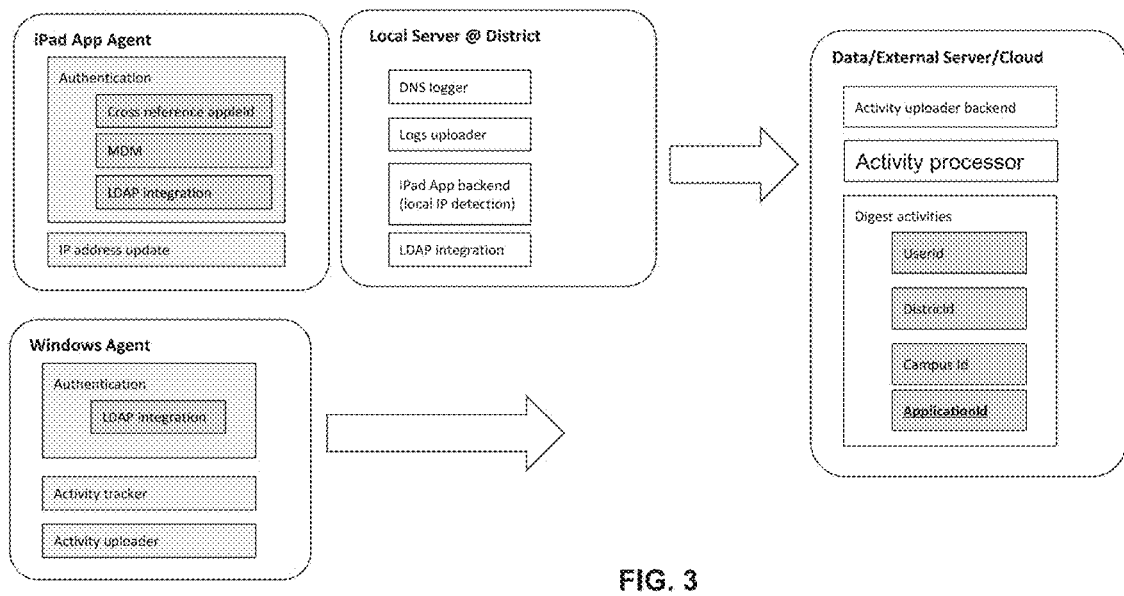
FIG. 3 is a functional flow diagram of features of the application tracker of FIG. 1

FIG. 3 shows features of the application tracker and its particular components and how such information is gathered and sent to the cloud server 120. For example, in particular embodiments, tablet and mobile devices may regularly switch their local IP addresses in a manner that makes tracking much more difficult as a single user session may be associated with multiple local IP addresses. Thus a software package is provided on the iPad (or other tablet/or computer) to track changes in local IP addresses to reduce or eliminate gaps in correlation of data due to the changing IP.

It is understood that the app tracker 102 and its components as well as the cloud server 120 may be made up of multiple physical servers or virtual servers on a single or plural physical servers and various combinations thereof.

The DNS and/or session data can further be tagged or may indicate various characteristics about the activity and/or application usage. For example, the category of the hosted application (math, language skills, history, science, foreign language, social studies, physical education, reading, literature and so forth), the elapsed use time (such as total time, start time, end time, number of session time outs and so forth), related user (user name, user identifier, user class, user grade and so forth), a related department (such the department associated with the device, the user, the educational application and so forth) or related organization (such as the school, campus and so forth) for the given session data. After the session data is properly formatted and stored, all related totals are updated in the database as well. Totals can include:

the time a specific educational software application was used across an entire organization, such as a school, school system, the time the specific educational software application was used or over a predetermined period, such as quarter, month, day, hour and so forth whether different educational software applications were used by the same users before a preferred application was selected campus and so forth whether a specific educational software application was preferred for specific classes whether a specific educational software application was used by students for a specific teacher, class, course, program of study, grade, problem type and so forth, whether a specific educational software application resulted in better results in less time, for a certain application (homework set, test), for a certain class, for a certain course and so forth Totals can be generated for any suitable meaningful, related data, can be used to create visualizations across a large number of users, and can be used for other suitable purposes.

An API 180 may also be provided in order to assemble data which is stored separate for privacy concerns/regulations. Particularly, two databases may be provided, one may be on the client/district side (i.e. where the particular device is accessing the network). This client side database can correlate a particular user id to an anonymous id. In this manner, the provider side database can then associate the anonymous id with the private IP usage stamps that track usage. Thus, the client side database not helpful without the provider side database and vice versa. Therefore, the API can allow for assembly and correlation of the two databases so that the user id and the private IP usage stamps that track usage are correlated together and can be used to track performance to usage of particular applications. The API is thus accessible to the entity or individual(s) who are authorized under appropriate privacy laws to access the data. For example, student information is protected under various privacy laws that prohibit entities that are not the school or the user from accessing such data which identifies the student. However, if the school would like to track performance in testing to usage of various applications via the private IP usage stamps, the school can use the API to assemble the data to now be identifying of the underlying user and this school can then determine how usage of particular applications correlates to in classroom performance. But, the provider side database separates the actual user id from the anonymous id such that the provider (who is typically not the underlying school) does not have the identifying information.

Figure 6:
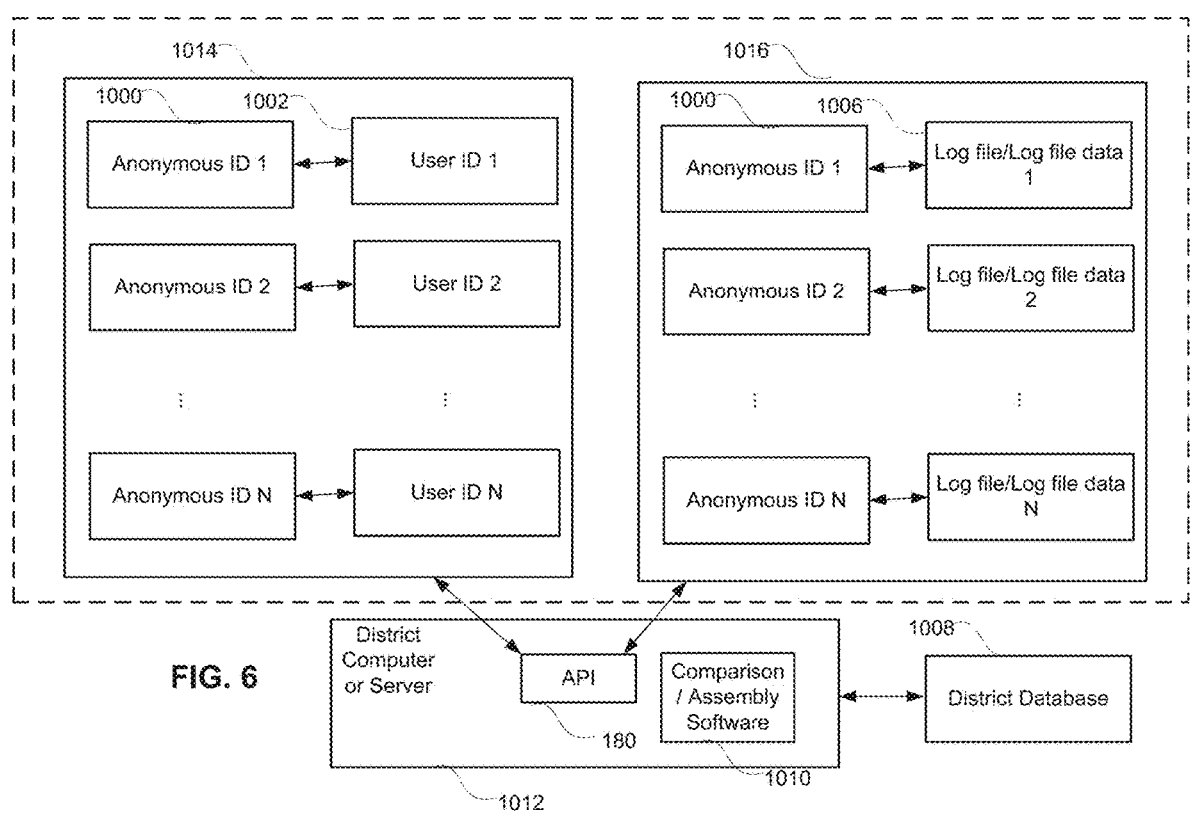
FIG. 6 is another functional flow diagram according to particular features of FIG. 1

FIG. 6 shows an example of how discrete databases 1014, 1016 are generated to separate identifying information. In particular aspects, the databases may be associated with separate computers/servers or may be separately virtualized servers/computers with different access protocols/requirements/permissions. Database 1014 associates an anonymous ID 1000 with the User ID 1002 (non-anonymous). Database 1016 associates the anonymous ID 1000 with the Log file/Log file data 1006. The API 180 can be run by a district computer with permissions/logins appropriate for accessing both databases and this API can enable to comparison/assembly software 1010 to assemble the data and compare to other district database 1008 information. For example, student performance which would allow for a comparison between the user ID 1002 and actual performance (e.g. grades). This provides the school with specific intelligence on which applications assist (or detract from) student performance.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for correlation private Internet Protocol (IP) addresses with usage of applications to associate particular users with the application usage, the system comprising:
   a software application which provides educational materials executes on a first server remote to a plurality of devices, said software application accessible by said plurality of devices via a network connection;
   a tracking software which executes on a processor and sends data to a second server said data received from said tracking software at said second server and indicative of a private IP address of one of the plurality of devices which accesses said tracking software;
   the one of the plurality of devices further having a public IP address associated therewith;
   said second server determining a user identifier based on said data and transmitting second data to a third server, said second data indicative of said private IP address and further indicative of a second server identifier;
   a Domain Name System (DNS) server which tracks usage of said software application by the one of the plurality of devices on said network connection to associate a time stamp, a domain and the private IP address with a log record, said log record transmitted to said third server; and
   said third server querying said log record by said private IP address to match data from said log record with data from said second data such that said log record is associated with the user identifier.

2. The system of claim 1 wherein said log record includes data which correlates to the second server identifier such that the DNS server can be correlated to the second server, allowing duplicate private IP addresses within log records to be distinguished based on the DNS server that the log record is associated with.

3. The system of claim 1 wherein said tracking software monitoring a change in said private IP address from the private IP address to a second private IP address, said tracking software transmitting data indicative of said change such that the user identifier associated with the private IP address is further associated with the second private IP address.

4. The system of claim 1 wherein the educational materials include online courseware.

5. The system of claim 1 wherein said second data associates an anonymous user identifier with the user identifier.

6. The system of claim 5 wherein said log record and said second data are stored respectively on first and second databases.

7. The system of claim 6 further comprising an Application Programming Interface (API) which accesses said log record and said second data and generates a combined data file which includes the user identifier associated directly with the time stamp, domain and the private IP address.

8. The system of claim 7 wherein said first and second databases have separate access requirements such that assembly into the combined data file is accomplished only through the API.

9. The system of claim 1 wherein said second data includes an association between the user identifier and an anonymous identifier.

10. The system of claim 1 wherein said log record associates an anonymous identifier with the time stamp, domain and private IP address.

11. A system for tracking usage of a plurality of hosted software applications by user devices having private and public Internet Protocol (IP) addresses comprising:
   a software which is executed on a first computing device which associates a private IP address of a device with a user identifier and records a user session in a first database, the user session associating the user identifier with the private IP address and the user session further related to a user accessing a hosted software application;
   a Domain Name System (DNS) server which matches the private IP address to a log record to generate matched data having a time stamp, a domain and the private IP address associated therewith; and
   a second computing device which correlates the matched data to the user session to associate the user identifier with the time stamp, domain and private IP address.

12. The system of claim 11 wherein the user identifier is anonymous and a data file stored on a database separate from the first database associates the user identifier with a non-anonymous user identifier.

13. The system of claim 12 further comprising an Application Programming Interface (API) being provided to access the data file stored on the database and the second computing device to associate the non-anonymous user identifier with the time stamp, domain and private IP address.

14. The system of claim 11 wherein said software determines a change in the private IP address to associate that change in the private IP address with the user session.

15. A system for tracking usage of a plurality of hosted software applications by user devices having a private Internet Protocol (IP) address and associated with a public IP address comprising:
- a portal provided by software which is executes on a first computer which associates a private IP address of a computing device with a user identifier and records a user session in a first database, the user session associating the user identifier with the private IP address and the user session further related to a user accessing a hosted software application via a network;
- the computing device further associated with a public IP address;
- a Domain Name System (DNS) server associated with the network, the DNS server matches the private IP address to a log record to generate matched data indicating a time stamp, a domain and the private IP address; and
- a second computing device which correlates the matched data to the user session to associate the user identifier with the time stamp, domain and private IP address.

16. The system of claim 15 wherein the user identifier is an anonymized user identifier.

17. The system of claim 16 further comprising a second database which stores data which correlates the anonymized user identifier with non-anonymized user identifier.

18. The system of claim 17 further comprising an Application Program Interface (API) which accesses the second data and the matched data to correlate the non-anonymized user identifier with the time stamp, domain and private IP address.

19. A method of tracking usage of a plurality of hosted software applications comprising:
- receiving data from a tracking software executing on a processor, the data indicative of a private Internet Protocol (IP) address of one of a plurality of devices which accesses one or more of the plurality of hosted software applications via a network, the one of the plurality of devices further associated with a public IP address;
- determining at a server a user identifier based on said data to generate second data which associates the user identifier with said private IP address;
- tracking usage of said software application with a Domain Name System (DNS) server to associate the private IP address of the device with a log record; and
- matching said log record with the user identifier by the private IP address.

20. The method of claim 19 wherein said second data is further indicative of a server identifier, the server identifier associated with at least one server associated with a Dynamic Host Configuration Protocol (DHCP) connection of the one of the plurality of devices.

21. The method of claim 19 wherein the public IP address is the same as a networking device associated with the network and more than one of the plurality of devices has the same public IP address.

* * * * *